Patented Jan. 25, 1938

2,106,435

UNITED STATES PATENT OFFICE 2,106,435

ABSORPTION OF ACIDIC GASES

Deric William Parkes and Richard Bromley Evans, West Bromwich, England, assignors to Robinson Brothers Limited, Oldbury, Birmingham, England, a British company No Drawing. Application January 16, 1937, Serial No. 121,014. In Great Britain January 20, 1936

11 Claims. (Cl. 23—2)

The present invention relates to certain new and useful improvements in the absorption of acidic gases and in particular of carbon dioxide, sulphur dioxide and hydrogen sulphide from gaseous mixtures containing them. The invention also contemplates recovering the gases after absorption in substantially pure form.

One object of the present invention is to provide a material of high absorptive efficiency capable of rapid reaction with the gas to be absorbed.

A further object of the invention is to provide a material which will continue to function efficiently as an absorbent until it is nearly saturated with the gas.

Yet a further object of the invention is to provide a material from which the gas after absorption can be recovered by simple treatment.

Yet a further object of the invention is to provide a simple and efficient means whereby an acidic gas may be absorbed almost completely from a gaseous mixture containing it and be subsequently liberated in substantially pure form.

According to the present invention one or more of the dipiperidyls or their homologues is used to absorb an acidic gas. These bodies are produced by the reduction of the corresponding dipyridyls or direct from the corresponding pyridine bases by electrolytic reduction. They are liquids or solids with boiling points above 250° C., freely soluble in water and possess great affinity for carbon dioxide for example, with which they form in aqueous solution well defined carbonates which are also soluble in water. At about 100° C. aqueous solutions of these carbonates begin to decompose into the original dipiperidyl and carbon dioxide and owing to the high boiling point of the former substantially the whole of the dipiperidyls remain behind after driving off the carbon dioxide.

The mixture of dipiperidyls and homologues produced by the electrolytic reduction of technical pyridine bases is very suitable for carrying out the present invention; those derived from pyridine itself and the lower homologues have the greatest rapidity of absorption, crystallize more readily and form crystalline salts more readily; the complex mixtures derived from the higher boiling fractions of technical pyridine bases such as the grade of which 90% distils up to 160° C., have not quite so great rapidity of absorption though still far greater than that of known absorbents, and neither they nor their salts crystallize so readily as those derived from pyridine itself.

Accordingly in its preferred form an aqueous solution of one or more of the dipiperidyls or their homologues, is used to scrub a gas containing carbon dioxide or other acidic gas, in any of the well known types of apparatus suitable for this purpose. The temperature of the absorbent may be allowed to rise as high as 80° C. without substantially decreasing the efficiency of the absorbent. When the latter is saturated its temperature is raised to 100°–160° C. according to the grade of absorbent in use, when the whole of the gas, part of the water, and substantially none of the absorbent distil over. The aqueous distillate is separated from the gas and returned to the absorbent when the latter is ready for re-use.

It has been found that crude dipiperidyls and homologues may contain some unknown impurity which during use gives rise to excessive frothing both during absorption and recovery; this body may be removed by blowing air through the dipiperidyls at slightly elevated temperatures, e. g. 70–75° and distilling the blown product. The oxidized impurity remains behind in the pitchy residue.

In order that the nature of the invention and the manner in which it is performed may be clearly understood examples of some processes carried out in accordance therewith will now be given.

(1) 25 grams of water containing—20 grams of dipiperidyls derived from the electrolytic reduction of technically pure pyridine boiling between 115° and 120° C. and purified as described above were placed in a simple bubble type wash bottle. Air containing 13.5–15% of carbon dioxide was bubbled through the liquid at the rate of 14.7–16.3 litres per hour until 21 litres of gas had been passed. The wash bottle containing the saturated dipiperidyls was then heated to a maximum of 140° C. until $CO_2$ ceased to be evolved. The gas evolved was measured and analyzed and the condensed aqueous distillate was returned to the wash bottle, and the operation of absorption and recovery repeated 21 times. 441 litres of gas containing 124.7 grams of $CO_2$ were treated, 81.5% of the $CO_2$ was removed from the gas and of this amount 99.3% was recovered from the absorbent. The average $CO_2$ content of the exit gas was 3.0%. The average amount of $CO_2$ recovered per cycle was 4.84 grams and at the 21st cycle 5.4 grams were recovered. The recovered gas contained over 99.5% of $CO_2$.

(2) To contrast the difference between the new absorbents and known absorbents, such as alkali carbonates and triethanolamine, 17 litres of air containing 13–14% of $CO_2$ were passed during one hour, through the following solutions—

(a) 20 grams dipiperidyls dissolved in 20 grams of water.

(b) 3.55 grams sodium carbonate, 9.7 grams of potassium carbonate dissolved in 44.15 grams of water.

(c) 20 grams of triethanolamine dissolved in 20 grams of water.

Solutions (a) and (b) should absorb about 4.7 grams of $CO_2$ at saturation point and (c) about 5.8 grams. Solution (b) is recommended as an efficient mixture for $CO_2$ absorption.

The results were as follows:—

|   | Percent | $CO_2$ in gas, grams | $CO_2$ absorbed, grams |
|---|---|---|---|
| a | 13.6 | 4.68 | 3.9 |
| b | 13.6 | 4.68 | 0.34 |
| c | 13.8 | 4.68 | 0.20 |

Even when the rate of throughput was reduced to 6.7 litres per hour through (b) the amount of $CO_2$ absorbed was only increased to 0.4 gram.

(3) 20 litres of gas containing 3.9% of $CO_2$ were passed through a solution of 5 grams of dipiperidyls in 5 grams of water at a speed of 16 litres per hour; the concentration of $CO_2$ in the gas was reduced from 3.9% to 0.9%.

(4) In this experiment 20 grams of dipiperidyl homologues derived from the electrolytic reduction of pyridine bases boiling between 130° and 165° C. dissolved in 25 grams of water was used. 21 litres of gas containing 15.2% of $CO_2$ was passed through this solution at 8.8 litres per hour. 2.72 grams of $CO_2$ were absorbed, and recovered from the absorbent by heating to 140° C.

The regenerated absorbent was used again with similar results.

(5) 21 litres of air containing 7.9% of hydrogen sulphide were passed through a solution of 20 grams of dipiperidyls in 25 grams of water, at a speed of 18 litres per hour. The whole of the hydrogen sulphide amounting to 1.66 litres was absorbed from the gas and was quantitatively regenerated when the absorbent was heated to 90–140° C.

When hydrogen sulphide from a Kipps generator was passed through the above mentioned quantity of absorbent, 4.35 litres of the gas were absorbed and then recovered. When sulphur dioxide is the gas which is being absorbed there is some danger of charring when the compound formed by absorption is being regenerated. This tendency can be avoided by adding water during the regeneration process so as to ensure that an excess of water is always present. There is no tendency to char when the carbon dioxide and hydrogen sulphide compounds are being regenerated and in these cases therefore the addition of water is an unnecessary precaution.

The process of the present invention has a number of important industrial applications of which the following may be mentioned:—

(a) Recovery of carbon dioxide for the production of liquid and solid carbon dioxides.

(b) The removal of carbon dioxide in certain hydrogenation processes where the hydrogen is re-circulated.

(c) Removal of carbon dioxide from coal gas.

(d) Rapid removal of carbon dioxide from the atmosphere in enclosed spaces where oxygen is being used.

The process is in no way limited to these applications and many others will be apparent to those skilled in the art.

We claim:—

1. In a process for removing a gas of the group consisting of carbon dioxide, hydrogen sulphide and sulphur dioxide from a gaseous mixture containing it, the step of bringing said gaseous mixture into contact with at least one substance from the group consisting of the dipiperidyls and their homologues.

2. In a process for removing an acidic gas from a gaseous mixture containing it, the step of passing said gaseous mixture through an aqueous solution of at least one substance from the group consisting of the dipiperidyls and their homologues.

3. In a process for removing and recovering a gas of the group consisting of carbon dioxide, hydrogen sulphide and sulphur dioxide from a gaseous mixture containing it, the steps of bringing said gaseous mixture into contact with at least one substance from the group consisting of the dipiperidyls and their homologues and thereafter decomposing the compound formed to liberate the absorbed gas.

4. In a process for removing and recovering a gas of the group consisting of carbon dioxide, hydrogen sulphide and sulphur dioxide from a gaseous mixture containing it, the steps of passing said gaseous mixture through an aqueous solution of at least one substance from the group consisting of the dipiperidyls and their homologues and thereafter decomposing the compound formed to liberate the absorbed gas.

5. In a process for removing and recovering carbon dioxide from a gaseous mixture containing it, the steps of passing said gaseous mixture through an aqueous solution of at least one substance from the group consisting of the dipiperidyls and their homologues and thereafter boiling the solution to liberate the absorbed gas.

6. In a process for removing and recovering hydrogen sulphide from a gaseous mixture containing it, the steps of passing said gaseous mixture through an aqueous solution of at least one substance from the group consisting of the dipiperidyls and their homologues and thereafter boiling the solution to liberate the absorbed gas.

7. In a process for removing and recovering sulphur dioxide from a gaseous mixture containing it, the steps of bringing said gaseous mixture into contact with at least one substance from the group consisting of the dipiperidyls and their homologues adding water to the resultant compound, thereafter heating the aqueous mixture to liberate the absorbed gas and during said heating adding water at intervals to prevent charring.

8. In a process for removing and recovering sulphur dioxide from a gaseous mixture containing it, the steps of passing said gaseous mixture through an aqueous solution of at least one substance from the group consisting of the dipiperidyls and their homologues and thereafter boiling the solution to liberate the absorbed gas and during said heating adding water at intervals to prevent charring.

9. In a process for removing a gas of the group consisting of carbon dioxide, hydrogen sulphide and sulphur dioxide from a gaseous mixture containing it, the steps of air-blowing at a slightly elevated temperature at least one substance from the group consisting of the dipiperidyls and their homologues, distilling the air-blown product, and bringing said gaseous mixture into contact with the distillate.

10. In a process for removing and recovering a gas of the group consisting of carbon dioxide and hydrogen sulphide from a gaseous mixture containing it, the steps of passing said gaseous mixture through an aqueous solution containing 40-50% of at least one substance from the group consisting of the dipiperidyls and their homologues and thereafter boiling the solution to liberate the absorbed gas.

11. In a process for removing and recovering sulphur dioxide from a gaseous mixture containing it, the steps of passing said gaseous mixture through an aqueous solution containing 40-50% of at least one substance from the group consisting of the dipiperidyls and their homologues and thereafter boiling the solution to liberate the absorbed gas and during said heating adding water at intervals to prevent charring.

DERIC WILLIAM PARKES.
RICHARD BROMLEY EVANS.